United States Patent
Deming et al.

[15] 3,696,680
[45] Oct. 10, 1972

[54] STEPPING MOTOR

[72] Inventors: Andrew Frank Deming; Clyde M. Lucas, both of Alliance, Ohio

[73] Assignee: Alliance Manufacturing Company, Inc.

[22] Filed: Nov. 18, 1970

[21] Appl. No.: 90,704

[52] U.S. Cl..................74/1.5, 310/49 R, 310/162, 340/157, 340/338
[51] Int. Cl.............................................F16h 27/00
[58] Field of Search....74/1.5; 310/49, 162; 340/157, 340/338

[56] References Cited

UNITED STATES PATENTS 2,544,330   3/1951   Koenig, Jr..............340/157 X

Primary Examiner—Milton Kaufman
Attorney—Woodling, Krost, Granger and Rust

[57] ABSTRACT

A stepping motor is disclosed which has a ratchet movement in a series of steps in a first path, which in the preferred embodiment is a circular path. The stepping motor is usable in a follow-up motor control system such as an antenna rotator with the rotator bi-directionally controlled in rotation and intermittently closing a pulsing switch. The stepping motor is usable as an indicator motor with this motor intermittently energized in accordance with energization of the rotator motor and closure of the pulsing switch. This supplies a torque to move a cam in a first path until it strikes an abutment. A cam follower is moved in a second path by the cam. The cam striking the abutment stalls the stepping motor rotor and upon opening of the pulsing switch, a spring urging means moves the cam follower in the opposite direction in the second path to reset the cam and follower ready for another energization of the stepping motor. The foregoing abstract is merely a resume of one general application, is not a complete discussion of all principles of operation or applications, and is not to be construed as a limitation on the scope of the claimed subject matter.

27 Claims, 7 Drawing Figures

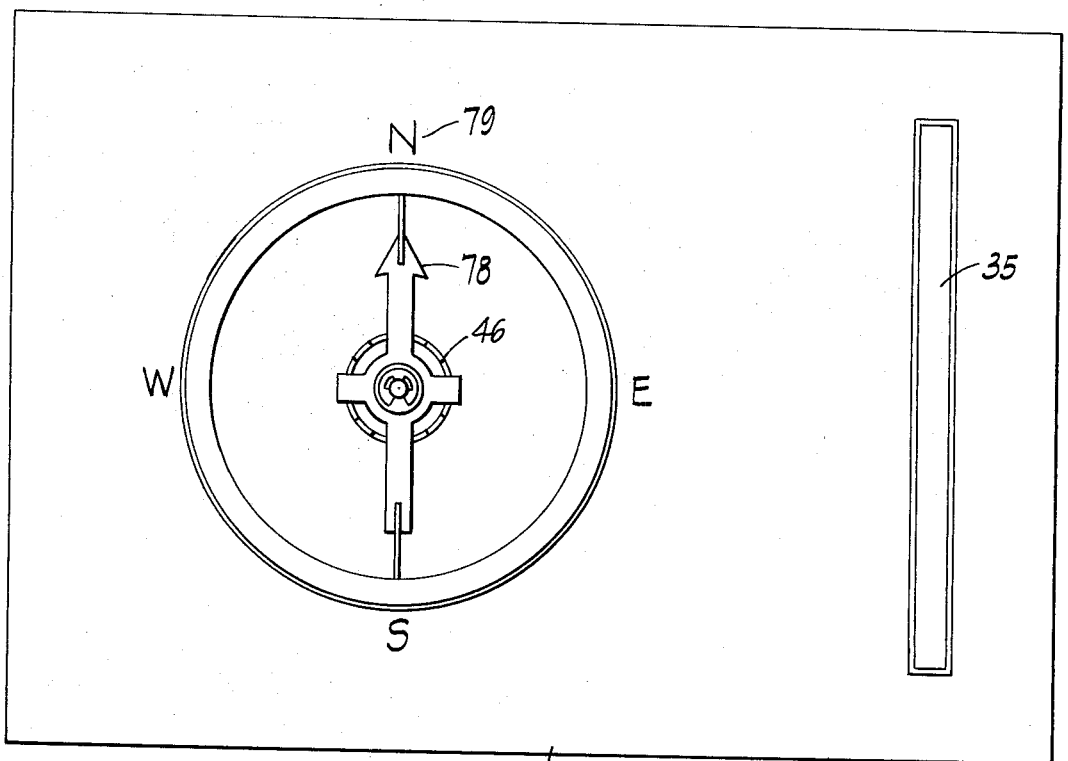
Fig. 1
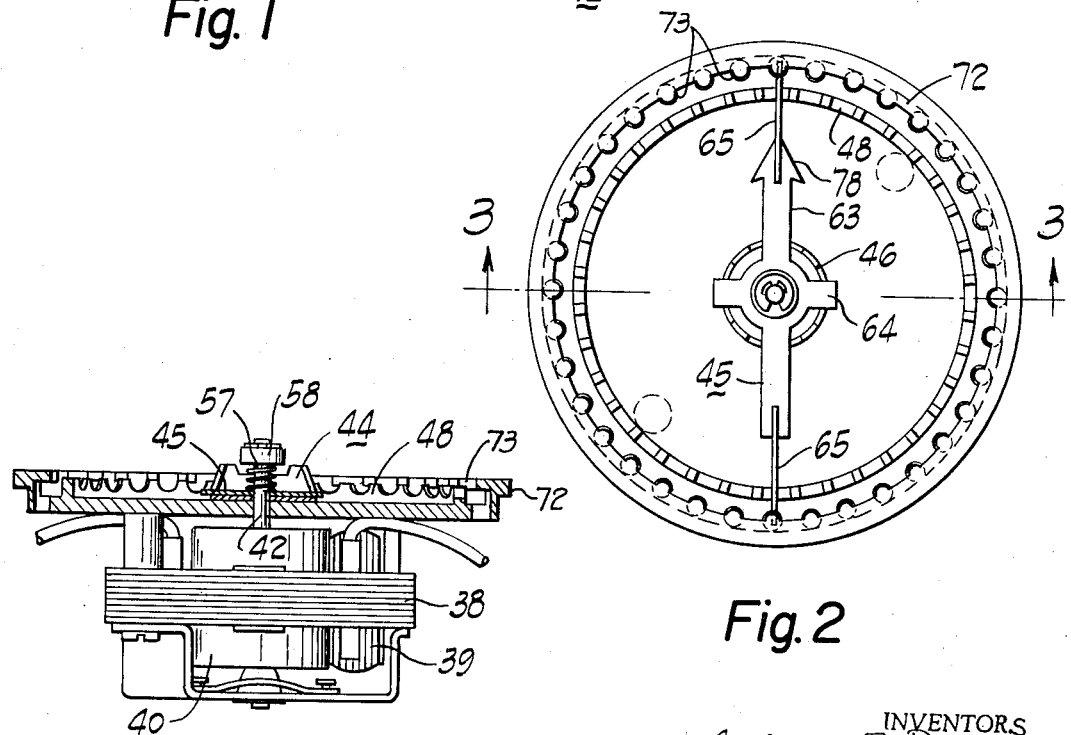
Fig. 2
Fig. 3
INVENTORS
Andrew F. Deming
BY Clyde M. Lucas
Woodling, Krost,
George and Rust
ATTORNEYS.

PATENTED OCT 10 1972 3,696,680

INVENTORS
Andrew F. Deming
BY Clyde M. Lucas
Woodling, Krost,
Granger and Rust
ATTORNEYS.

STEPPING MOTOR

BACKGROUND OF THE INVENTION

Stepping motors of many types have been devised, however, most of these are unidirectional ratcheting devices which typically have a saw tooth shape of a sloping tooth plus a sharp fly-back. As a result, the ratcheting mechanism is easily moved by a pawl but only in one direction of rotation.

Follow-up motor control systems have also been utilized in many cases of steering ships rudders or remote control of antenna rotators, for example, and in such case bi-directional devices are usually required. This has usually meant that a bi-directional motor has been used in the remotely controlled power device and it is frequently desirable to have some form of indication of the actual position of the remotely controlled power output. Pulsing switches have been driven by the power output and used to provide some form of indication at the control unit. In many cases, however, the stepping motor was unsatisfactory for a remote control indicator, because it was only unidirectional whereas a bi-directional indicator was required for a bi-directional power output. Selsyn devices are satisfactory as indicators, however, these require at least three interconnecting wires and are usually too expensive for many applications such as antenna rotators.

Accordingly, an object of the invention is to obviate the above-mentioned disadvantages.

Another object of the invention is to provide a bidirectional ratchet rotator which may be used as an indicator motor in a follow-up motor system.

Another object of the invention is to provide a stepping motor with a cam and cam follower relatively rotatable in a first path and providing movement in a second path transverse thereto.

Another object of the invention is to provide cam and cam follower means relatively movable along a first path to provide relative movement along a perpendicular second path together with abutment means terminating the relative movement until overcome by an urging means force along said second path.

Another object of the invention is to provide a stepping motor wherein a cam follower moves in a zigzag path laterally relative to a first path as a mean.

Another object of the invention is to provide a stepping motor which is bi-directional and operates equally well with a change of direction along a first path and utilizing the same urging means along a perpendicular second path.

SUMMARY OF THE INVENTION

The invention may be incorporated in a stepping motor comprising, in combination, cam means and cam follower means cooperable therewith relatively movable in a first path and in a second path transverse thereto, one of said cam means and cam follower means having a plurality of first camming surfaces, junction surfaces between said first camming surfaces and disposed along said first path, said cam means having a component in said first path and another component perpendicular to said first path, first and second abutment means, means providing relative movement between said first and second abutment means in accordance with relative movement along said first path of said cam means and cam follower means, one of said first and second abutment means having abutting surface means substantially perpendicular to said first path, said abutting surface means terminating in terminal surface means, entrapment surface means as part of said abutment means, motive means to provide relative movement along said first path between said cam means and said cam follower means with engagement therebetween at one of said first camming surfaces establishing relative movement of said cam means and cam follower means in a first direction long said second path until said cam means and cam follower means relatively move in said first path past an adjacent junction surface to effect engagement between said abutment means at said entrapment surface means, and means urging said cam means and cam follower means in a second opposite direction in said second path to establish relative movement of said first and second abutment means along said abutting surface means past said terminal surface means and to establish cooperation between said cam means and cam follower means at an adjacent one of said first camming surfaces.

Other objects and a fuller understanding of the invention may be had by referring to the following description and claims, taken in conjunction with the accompanying drawing.

BRIEF DESCRIPTION OF THE DRAWING

FIG. 1 is a plan view of an antenna rotator incorporating the invention;

FIG. 2 is a plan view of the stepping motor removed from the rotator housing of FIG. 1;

FIG. 3 is a sectional view on line 3—3 of FIG. 2 but showing the motor in elevation;

DESCRIPTION OF THE PREFERRED EMBODIMENT

Figure 4:
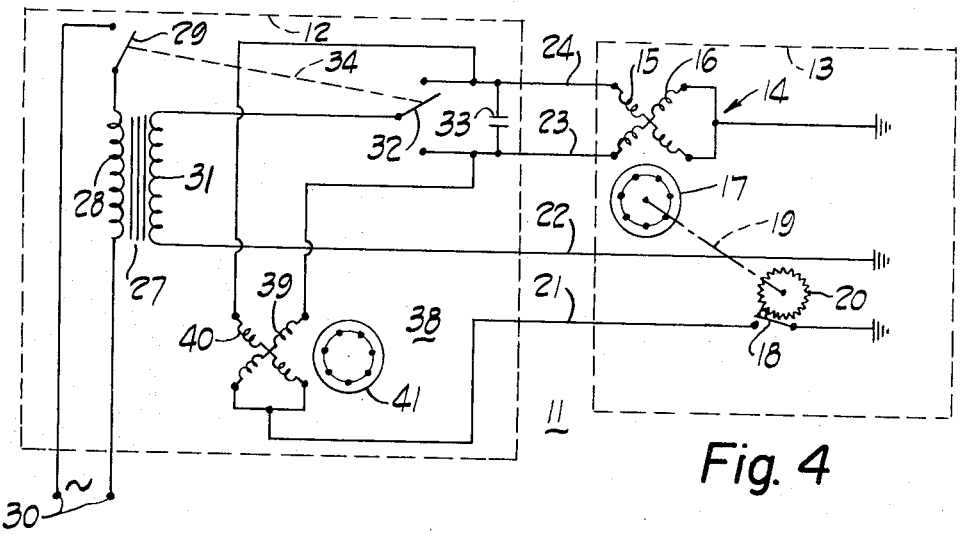
FIG. 4 is a schematic diagrm of a circuit of the follow-up motor control system of FIG. 1.

FIGS. 1 to 5 show the construction and circuit diagram of a follow-up motor control system 11 illustrating a preferred embodiment of the invention. This motor control system 11 has a first unit 12 and a second unit 13 with the first unit 12 a control unit and the second unit 13 a power unit. The power unit 13 includes a power motor shown as a reversible induction motor 14 having windings 15 and 16 and a rotor 17. The rotor 17 intermittently opens and closes a pulsing switch 18 as diagrammatically illustrated by a connection such as a gear reduction 19 to an actuator wheel 20 to intermittently open and close the pulsing switch 18. The pulsing switch 18 is connected across conductors 21 and 22 and conductors 23 and 24 are connected to an end of each of the motor windings 15 and 16.

The first or control unit 12 includes a transformer 27 having a primary winding 28 energizable through a primary switch 29 from an alternating voltage source 30. The transformer 27 has a secondary winding 31 with one end connected to the conductor 22 and the other end connected to a double-throw switch 32. This double-throw switch alternatively energizes directly either conductors 24 or 23. A capacitor 33 connected across these conductors provides reversible rotational energization to the rotor 17 in a well-known manner of a capacitor induction motor. An interconnection 34 is preferably provided between the primary and secondary switches 29 and 32 so that the primary switch 29 is closed whenever the secondary switch 32 is closed on one or the other double-throw contacts. A switch bar 35 shown in FIG. 1, actuates these two switches 29 and 32. By depressing one end of this bar, switch 29 is closed and also switch 32 contacts conductor 24. By depressing the other end of this bar, switch 29 is closed and also switch 32 contacts conductor 23.

An indicator motor 38 is provided in the control unit 12 to provide an indication of the rotational position of the output of the power motor 14. This motor may be provided with a gear train 19 for speed reduction of the output and when used as a ship's rudder actuator, for example, might have only a 90° arcuate movement. When used with an antenna rotator it might have a 360° or 370° arcuate movement of the output. The indicator motor 38 provides an indication at the control unit 12 of the rotational position of such output of the power motor 14.

This indicator motor 38 is a stepping motor and a bidirectional stepping motor, more fully illustrated in FIGS. 2, 3, 5 and 6. The indicator motor 38 has windings 39 and 40 connected to he conductors 23 and 24, respectively, to be energized in accordance with energization of the power motor 14. The other ends of the windings 39 and 40 are interconnected and connected to conductor 21 so that the energization to this indicator motor 38 is directly in accordance with the closure of the pulsing switch 18. The indicator motor 38 also has a rotor 41 and this motor will be energized for rotation of the rotor in the same rotational direction as the power motor 14.

Figure 5:
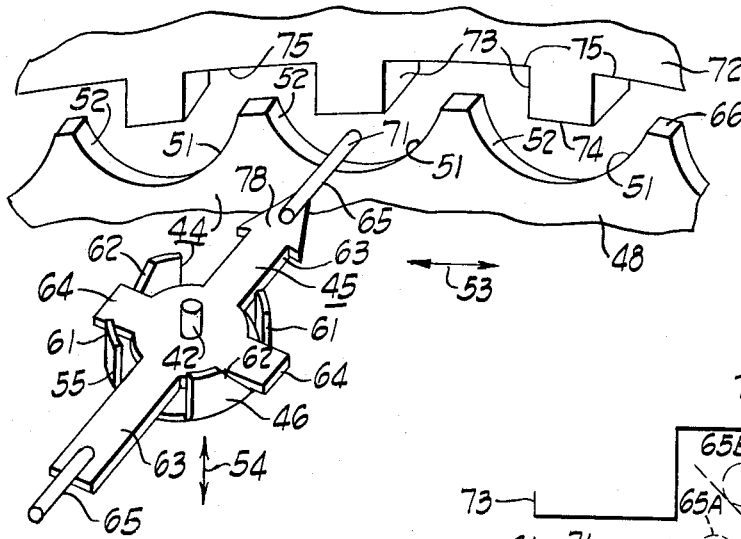
FIG. 5 is an enlarged view partially diagrammatical showing the operation of the stepping motor.
Figure 6:
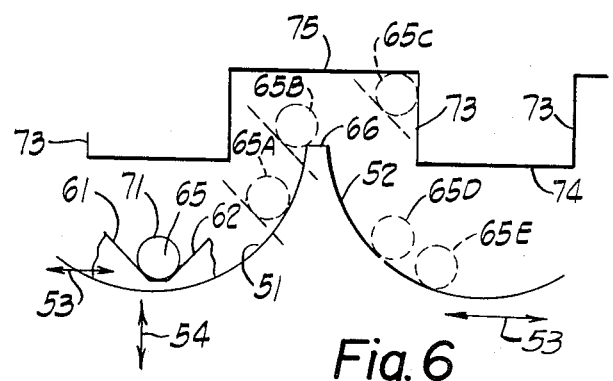
FIG. 6 is another enlarged diagrammatical view of the operation of the stepping motor.

FIG. 3 shows this motor 38 with the windings 39 and 40 providing rotation of the rotor shaft 42. Cam means 44 and cam follower means 45 are provided in this indicator motor 38. The cam means 44 includes a first cam 46 and a second cam 48. The cam means 44 and the cam follower means 45 have a plurality of first camming surfaces 51 and a plurality of second camming surfaces 52. In this preferred embodiment, as best shown in FIGS. 5 and 6, the first and second camming surfaces are on the second cam 48. These first and second camming surfaces 51 and 52 alternate along the second cam 48 and are generally disposed along a first path 53. In this preferred embodiment the first path is arcuate and is also annular or circular. The first and second camming surfaces 51 and 52 have a component in a second path 54 which is perpendicular to this first path 53. The first cam 46 in this preferred embodiment includes a member fixed to rotate with the shaft 42 and has four upstanding fingers 55. Urging means in the form of a compression spring 57 acts between a shoulder 58 on the shaft 42 and the cam follower acts 45 to urge this cam follower means downwardly between the fingers 55. First sloping surfaces 61 are provided on two of the cam follower fingers 55 and second sloping surfaces 62 are provided on the remaining two fingers 55 for alternate cooperation with the cam follower 45. This cam follower 45 is made in a cross-shaped with long legs 63 and short legs 64 perpendicular thereto. The opposite edges of the short legs 64 are the real cam follower portions coacting with the first and second sloping surfaces 61 or 62. Cam follower pins 65 extend from the ends of the long legs 63 of the cam follower means to coact with the second cam 48 and more particularly to coact with the first and second camming surfaces 51 and 52. In the preferred embodiment the first and second camming surfaces 51 and 52 alternate generally along the first path 53 and merge together smoothly at the bottom of a U-shaped surface 51-52. Junction surfaces 66 are provided between each of the first camming surfaces 51 and are disposed generally along the first path 53. In this preferred embodiment of the stepping motor which is a bi-directional stepping motor, the plurality of junction surfaces 66 alternate between pairs of adjacent first and second camming surfaces 51-52.

First and second abutment means 71 and 72, respectively are provided in the stepping motor 38. In this preferred embodiment the second cam 48 is stationary and the second abutment means 72 is also stationary. Either the first or second abutment means includes a plurality of abutting surfaces 73 and in this preferred embodiment the abutting surfaces provided on the second abutment means 72. A plurality of terminal surfaces 74 are provided one each connected with a corresponding abutment surface 73. The plural terminal surfaces 74 are disposed generally along the first path 53. Plural entrapment surfaces 75 are provided between adjacent ones of the abutting surfaces 73. These plural entrapment surfaces are provided generally along the first path 53. In this preferred embodiment the first abutment 71 is a part of the cam follower pins 65.

OPERATION

FIGS. 5 and 6 diagrammatically explain the operation of the stepping motor 38. The circuit diagram of FIG. 4 illustrates that whenever one end of the switch bar 35 is depressed, this will energize the entire system by closure of the primary switch 29 and closure of one pole of the secondary switch 32. Assuming that the power motor rotor 17 rotates in clockwise direction, this will also establish clockwise directional rotation of the indicator motor 38, each time that the pulsing switch 18 is closed, When this happens, this provides a motive means to attempt to rotate the shaft 42 and the cam means 44 in a clockwise direction. The cam means 44 includes the first cam 46 with its upstanding fingers 55 and the first and second sloping surfaces 61 and 62 on these fingers. With the aforementioned clockwise direction of torque application, only the first sloping surfaces 61 will be active. These sloping surfaces rotate in a first direction, clockwise, along the first path 53. The two first sloping surfaces 61 coact with diametrically opposite edges of the short legs 64 of the cam follower 45. The solid lines of FIG. 6 show this cam follower pin 65 as diagrammatically acted on by this first sloping surface 61 and this is for simplicity in this figure in better explaining the operation. This clockwise rotation will be to the right as viewed in FIGS. 5 and 6 and the first sloping surfaces 61 will directly move the cam follower pin 65 in a clockwise direction until this pin engages the first camming surface 51 of the second cam 48. The first camming surface 51 thus acts as a reaction member. There is relative movement along the first path 53 between the first sloping surface 61 and the first camming surface 51 and the resultant is that the cam follower pin 65 is moved upwardly through a position 65A shown in FIG. 6. This upward movement is movement in a first direction in the second path 54. Continued movement to the right of the first sloping surface 61 moves the cam follower pin through an intermediate position 65B whereat this pin 65 is able to pass over an adjacent one of the junction surfaces 66. Still further movement to the right of the first sloping surface 61 moves the cam follower pin 65 into engagement with the next adjacent abutting surface 73 and it is then driven upwardly by further movement of the first sloping surface 61 so that this cam follower pin 65 also engages the adjacent entrapment surface 75. The cam follower 45 then is arrested in movement with the cam follower pin in the phantom position 65C. This stalls the rotor 41 of the stepping motor 38 and the continued application of torque acting on the first sloping surface 61 traps the cam follower pin 65 between the abutting surface 73 and the entrapment surface 75.

The urging means 57 is next empowered to overcome this entrapment. In the preferred embodiment this takes place when the pulsing switch 18 is next opened. This de-energizes the stepping motor 38 and accordingly the force of the compressed urging means spring 57 pushes the cam follower 65 downwardly in a second opposite direction along the second path 54. In so doing this cam follower pin 65 follows along the abutting surface 73 until it passes the next adjacent terminal surface 74. Also in such movement the first sloping surface 61 is moved in a second direction along the first path 53; namely, in a counterclockwise direction. The cam follower pin passes through an intermediate position 65D to a final position 64E whereat it engages the second camming surface 52 and the cam follower is also in engagement with both the first and second sloping surfaces 61 and 62. It is then ready for the next energization of the stepping motor 38 to step through another cycle as described above. It will be noted that the cam means 44 rotates in a clockwise direction approximately 20° before the rotor is stalled and then is rotated back in a counterclockwise direction about 10° as the urging means 57 forces the cam follower downwardly in the second path 54 after the motor 38 is de-energized. Thus for each successive energization of the stepping motor 38, the cam follower 45 moves a net 10° in this preferred embodiment so that 36 such steps are required for a 360° rotation. This is a zig-zag path of cam follower 45, relative to the first path 53 as a mean. As shown in FIG. 1 the cam follower 45 is a moving indicator 78 cooperating with fixed indicia 79 on the control unit 12 in order to indicate the rotational position of the output of the power motor 14.

If the power motor 14 is energized for counterclockwise rotation, then the indicator motor 38 is also energized when pulsing switch 18 is closed. In such case the shaft 42 will provide a counterclockwise torque and the second sloping surfaces 62 will coact with the cam follower 45 to move it in a counterclockwise direction along the first path 53. Again there will be a component of movement along the second path 54 until this cam follower pin is driven into the opposite corner between an abutting surface 73 and an entrapment surface 75. Since the mechanism is symmetrical as shown in FIGS. 5 and 6, this stepping will continue in the counterclockwise direction until the indicator motor 38 is de-energized completely when the pulsing switch 18 no longer is closed. When the switch bar 35 is no longer depressed, this will de-energize the entire system and the indicator motor 38 will always indicate the rotational position of the output of the power motor 14 both during rotation in either direction and after de-energization of the entire system.

The abutting surfaces 73 are substantially perpendicular to he first path 53 and perpendicular to the entrapment surfaces 75 to trap the cam follower pins 65 and stall the stepping motor rotor. The rotor 41 is a motive means to provide relative movement along the first path between the cam means 44 and the cam follower means 45. This provides engagement therebetween at one of the first camming surfaces 51 or at one of the second camming surfaces 52. As recited above, this establishes relative movement between the cam means 44 and the cam follower means 45 in a first or upward direction along the second path 54 until the cam and follower means 44-45 relatively move in the first path 54 over and past an adjacent junction surface 66 to effect engagement between the abutment means 71 and 72 at an entrapment surface 75. The intermittent closure of the pulsing switch 18 is a means which establishes movement in a second direction in the second path 54 to overcome the component of force in the first direction in the second path by the motive means 41. In this preferred embodiment this second direction movement is aided by the de-energization of the motor 38.

Figure 7:
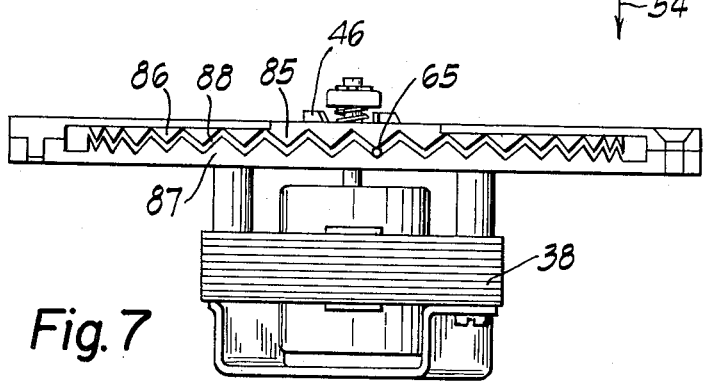
FIG. 7 is a view similar to FIG. 3 of a modification.

FIG. 7 shows a modification of the invention in a view similar to that shown in FIG. 3. The motor 38 is again connected to rotate a shaft and to rotate cam means 44 with a first cam 46 the same as in FIG. 3. This provides engagement with a cam follower means 45 the same as in FIG. 3 to move a cam follower pin 65 again the same as in FIG. 3. The cam means 44 includes a second cam 85 which again is fixed just as the second cam 48 was fixed in FIG. 3. This second cam 85 has an upper member 86 and a lower member 87 defining a cam track space 88 therebetween. The cam follower pin 65 followers in this cam track space 88. This more clearly defines the zig-zag path which the cam follower 45 takes, being a zig-zag path laterally on either side of the first path 53 about this first path as a mean. The action is similar to that in the preferred embodiment with clockwise rotation, for example, of the first cam 46 driving the cam follower pin 65 up the cam track space 88 until it engages the upper member 86. This engagement is at an entrapment surface because it is substantially perpendicular to its previous path of movement. Upon the next opening of the pulsing switch 18, the motor 38 terminates its clockwise torque and hence the urging means 47 is able to drive the cam follower pin 65 down the next adjacent zig-zag portion of the cam track space 88 until it reaches the bottom and engages the perpendicular to the path wall on the lower member 87. It is then ready for the next cycle of operation upon energization of the indicator motor 38. This second embodiment is also bi-directional because of the symmetry in the parts and the cam track path.

The present invention provides a stepping motor which is a bi-directional ratchet motor capable of equal operation in either clockwise or counterclockwise direction. This stepping motor is directly usable in a follow-up motor control system to indicate the position of the output of the power motor 14. The stepping motor 38 is of simple construction and economical to manufacture because it need provide only a small amount of torque in the order of one ounce-inch of torque, for example, and thus the parts are light and of little mass for low inertia. This permits the motor 38 to rapidly accelerate through its approximately 20° arcuate movement before it is stalled. The low inertia also permits the approximately 10° counterclockwise rotation by the urging means spring 57 whenever the motor 38 is de-energized. This permits this indicator motor to accurately follow the position of the power motor output. The stepping motor 38 is also usable with economical antenna rotators, for example, wherein a low selling price yet accurate position indication is required. The stepping motor 38 is capable of follow-up motor control bidirectionally, just as a Selsyn motor system, yet with only two interconnecting conductors 21 and 22 instead of three for the Selsyn.

As best shown in FIGS. 2 and 3, the second cam 48 and the second abutment means 72 may be made from a single unitary piece of material. The second cam 48 is of a different radius from the second abutment means 72, and as shown it has a smaller radius. The second cam 48 lies in a first path which is arcuate and in fact is circular. These different radii permit the second cam 48 and second abutment means 72 to be manufactured from moldable material such as plastic in a mold o only two parts. The cope and drag molds will be able to shape the upper part of the second cam 48 and also have free access to shape the upper and lower parts of the second abutment means 72. This has the advantage of assuring concentricity of the second cam and the second abutment means. If these were two separate parts, then special care would have to be taken during assembly of these two parts to make sure that they were concentrically aligned so that the cam follower 45 would properly cooperate therewith. Another advantage in this unitary construction is that any slight inaccuracies in the angular spacing between successive camming surfaces 51, 52 of the second cam 48, will be inconsequential because such camming surfaces are always adjacent the same part of the second abutment means 72. If the second cam 48 and the second abutment means 72 were on separate manufactured pieces, then slight angular mis-alignment between successive camming surfaces 51, 52 could adversely affect the proper operation of the stepping motor as the cam follower 45 attempted to move around the first path.

Another advantage of this unitary construction with the different radii is ease of assembly. The moving indicator 78 may be assembled by simply slipping the cam follower pins 65 underneath the wall forming the second abutment 72 as this moving indicator 78 is assembled onto the rotor shaft 42. This is easy assembly compared to attempting to assemble the moving indicator between two spaced plates as in the embodiment of FIG. 7. In this preferred embodiment of FIGS. 1 through 6, the mass of the rotor 41 is not suspended on the pointer or moving indicator 78, instead the torque action of this rotor is separated from the axial camming action.

The entrapment surfaces 75 may be physically a part of the second abutment means 72 or may be in several other locations. This entrapment surface 75 may be on the first cam 46 or may be on the rotor shaft 42, just so long as it limits the upward axial movement of the cam follower means 45. As shown in FIGS. 2 and 3, the outer rim contains only the abutting surfaces 73 and lower terminal surfaces 74, but does not contain anything which is an entrapment surface. In FIG. 3, that which limits the upward vertical movement is the fact that the coils of the compression spring 57 collapse and abut and thus limit the upward vertical movement of the pointer 78. The abutting surfaces 73 have sufficient axial extent so that the cam follower pins 65 do not climb over the top of these abutting surfaces 73. The shoulder 58 is actually an inverted cup held in place by a snap ring. An alternative construction of the entrapment surface would merely be to lengthen this cup so that the lower rim limited the upward movement of the pointer 78.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A stepping motor comprising, in combination,
cam means and cam follower means cooperable therewith relatively movable in a first path and in a second path transverse thereto,
one of said cam means and cam follower means having a plurality of first camming surfaces,
junction surfaces between said first camming surfaces and disposed along said first path,
said cam means having a component in said first path and another component perpendicular to said first path,
first and second abutment means,
means providing relative movement between said first and second abutment means in accordance with relative movement along said first path of said cam means and cam follower means,
one of said first and second abutment means having abutting surface means transverse to said first path,
said abutting surface means terminating in terminal surface means,
entrapment surface means as part of said abutment means,
motive means to provide relative movement along said first path between said cam means and said cam follower means with engagement therebetween at one of said first camming surfaces establishing relative movement of said cam means and cam follower means in a first direction along said second path until said cam means and cam follower means relatively move in said first path past an adjacent junction surface to effect engagement between said abutment means at said entrapment surface means, and means relatively urging said cam means and cam follower means in a second opposite direction in said second path to establish relative movement of said first and second abutment means along said abutting surface means past said terminal surface means and to establish cooperation between said cam means and cam follower means at an adjacent one of said first camming surfaces.

2. A stepping motor as set forth in claim 1, wherein said abutting surface means includes a plurality of abutting surfaces disposed along said first path.

3. A stepping motor as set forth in claim 1, wherein said entrapment surface means includes a plurality of entrapment surfaces disposed along said first path.

4. A stepping motor as set forth in claim 3, wherein said entrapment surface means is connected to said abutting surface means.

5. A stepping motor as set forth in claim 1, wherein said terminal surface means includes a plurality of terminal surfaces disposed along said first path.

6. A stepping motor as set forth in claim 1, including a plurality of abutting surfaces in said abutting surface means disposed along said first path,
a plurality of entrapment surfaces in said entrapment surface means disposed along said first path,
a plurality of terminal surfaces in said terminal surface means disposed along said first path,
and a terminal surface being disposed at one end of each abutting surface and an entrapment surface disposed at the other end of each said abutting surface.

7. A stepping motor as set forth in claim 1, wherein said cam means includes a first movable cam,
said cam follower means being movable,
said terminal surface means being disposed at one end of said abutting surface means and said entrapment surface means disposed at the other end of said abutting surface means,
said first abutment means being movable with said cam follower means to coact with said first cam and be moved in said first direction along said second path to be trapped between said abutting surface means and the adjacent entrapment surface means,
and upon said urging means being effective said cam follower means being moved in said second opposite direction in said second path to move said cam follower means along the abutting surface means past the adjacent terminal surface means and into engagement with said cam means thereby moving said first cam in the opposite direction in said first path.

8. A stepping motor as set forth in claim 1, wherein said cam means includes a first movable cam,
said cam follower means being movable,
a plurality of abutting surfaces in said abutting surface means fixedly disposed along said first path,
a plurality of entrapment surfaces in said entrapment surface means fixedly disposed along said first path,
a plurality of terminal surfaces in said terminal surface means fixedly disposed along said first path,
a terminal surface being disposed at one end of each abutting surface and an entrapment surface disposed at the other end of each said abutting surface,
said first abutment means being fixed on said cam follower means to be movable therewith to coact with said first cam and be moved in said first direction along said second path to be trapped between an abutting surface and the adjacent entrapment surface,
and upon said urging means being effective said cam follower means being moved in said second opposite direction in said second path to move said cam follower means along the respective abutting surface past the adjacent terminal surface and into engagement with said cam means thereby moving said first cam in the opposite direction in said first path.

9. A stepping motor as set forth in claim 1, wherein said motive means and said urging means establish relative movement of said cam means and cam follower means in a zig-zag path laterally relative to said first path as a mean.

10. A stepping motor as set forth in claim 1, wherein said motive means relatively moves said cam means and cam follower means in a first direction along said first path,
and said urging means relatively moves said cam means and said cam follower means in the opposite direction along said first path as the cam means and cam follower means are relatively moved in the second direction along said second path.

11. A stepping motor as set forth in claim 1, wherein said first path is an arcuate path and said motive means establishes torque along said arcuate path.

12. A stepping motor as set forth in claim 11, wherein said first path is a circular path and said motive means establishes torque for movement in all positions around said circular path.

13. A stepping motor as set forth in claim 1, including first and second cams in said cam means,
and each said first and second cam cooperating with said cam follower.

14. A stepping motor as set forth in claim 13, wherein said first camming surfaces are provided on one of said first and second cams.

15. A stepping motor as set forth in claim 13, including means establishing relative movement between said first and second cams.

16. A stepping motor as set forth in claim 15, including means establishing relative movement between said cam follower and each of said first and second cams.

17. A stepping motor as set forth in claim 16, wherein said first cam is directly moved by said motive means,
said second cam being stationary and reacting with said cam follower means as said cam follower means is moved by said first cam in said first path to combine with said first cam movement to move said cam follower means in said first direct-on in said second path.

18. A stepping motor as set forth in claim 1, including a plurality of second camming surfaces on said one of said cam means and cam follower means, said second camming surfaces having a component in said first path and another component in said second path opposite to the component in said second path of said first camming surfaces, and said motive means being bi-directional for engagement between said cam means and said cam follower means at said first camming surfaces or at said second camming surfaces depending upon the direction of relative movement along said first path.

19. A stepping motor as set forth in claim 18, wherein said first and second camming surfaces alternate along said first path.

20. A stepping motor as set forth in claim 19, wherein said junction surfaces join said first and second camming surfaces.

21. A stepping motor as set forth in claim 18, wherein said first and second camming surfaces are generally U-shaped between adjacent junction surfaces.

22. A stepping motor as set forth in claim 18, wherein said first and second camming surfaces are generally V-shaped between adjacent junction surfaces.

23. A stepping motor as set forth in claim 1, wherein said motive means is intermittently active along said first path and said urging means is continuously active along said second path.

24. A stepping motor as set forth in claim 1, wherein one of said motive means and urging means is intermittently active and the other of said motive means and urging means is continuously active.

25. A stepping motor as set forth in claim 1, wherein said first path is arcuate, and said second cam has a radius different from said second abutment means.

26. A stepping motor as set forth in claim 1, wherein said first path is circular, and said second cam has a radius smaller than said second abutment means to permit manufacture of said second cam and abutment means as a unitary piece from moldable material in a mold of only two parts.

27. A stepping motor as set forth in claim 26, wherein said cam follower means has a radius substantially the same as said second abutment means to be readily assembled in said motor by movement axially toward one side of said second cam and second abutment means.

* * * * *